(12) United States Patent
Küpfer et al.

(10) Patent No.: US 8,193,982 B2
(45) Date of Patent: Jun. 5, 2012

(54) CONTROLLING A GPS RECEIVER BY DETECTING MOTION BASED ON RADIOFREQUENCY SIGNAL TRACES

(75) Inventors: Sandra Marcela Küpfer, Kitchener (CA); Michael Stephen Brown, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 192 days.

(21) Appl. No.: 12/699,324

(22) Filed: Feb. 3, 2010

(65) Prior Publication Data

US 2010/0328154 A1    Dec. 30, 2010

Related U.S. Application Data

(60) Provisional application No. 61/221,348, filed on Jun. 29, 2009.

(51) Int. Cl.
*G01S 19/34* (2010.01)
(52) U.S. Cl. .................................. 342/357.74
(58) Field of Classification Search .............. 342/357.74
See application file for complete search history.

(56) References Cited

U.S. PATENT DOCUMENTS

| | | |
|---|---|---|
| 2002/0127967 A1 | 9/2002 | Najafi |
| 2003/0081657 A1 | 5/2003 | Ranta |
| 2008/0224925 A1 | 9/2008 | Ochenbauer |
| 2009/0192709 A1 * | 7/2009 | Yonker et al. ............ 701/215 |

FOREIGN PATENT DOCUMENTS

FR    2915343 A1    10/2008

OTHER PUBLICATIONS

European Search Report from corresponding EP Application dated Apr. 15, 2011.
Timothy Sohn et al. "Mobility Detection Using Everyday GSM Traces" UbiComp 2006: Ubiquitous Computing (2006) pp. 212-224.
Ian Anderson et al. "Context Awareness via GSM Signal Strength Fluctuation" http://www.pervasive2006.org/ap/pervasive2006_adjunct_1C.pdf.
Katayoun Farrahi et al. "Daily Routine Classification from Mobile Phone Data" http://www.idiap.chi/~gatica/publications/FarrahuGatica-mimi08.pdf.
Deblauwe et al. "Hybrid GPS and GSM Localization—energy-efficient detection of spatial triggers" Positioning, Navigation and Communication, 2008. WPNC 2008, Mar. 27-27, 2008 pp. 181-189.
Goh Pong Chai, "Alternative Positioning Method Using GSM Signals" Journal of Global Positioning Systems (2004) vol. 3, No. 1-2: 101-105.

(Continued)

*Primary Examiner* — Harry Liu
(74) *Attorney, Agent, or Firm* — Gowling Lafleur Henderson LLP

(57) ABSTRACT

Operation of a GPS receiver on a wireless communications device is controlled by determining whether the device is stationary or in motion. Motion determination is accomplished by analyzing radiofrequency signal traces, e.g. GSM signal traces, received from one or more nearby base stations. A three-tiered analysis provides a progressively more accurate determination as to whether the device is moving or stationary while providing, in certain instances, a more rapid determination than prior-art techniques. When the device is determined to be stationary, the GPS receiver can be deactivated. When the device is determined to be moving, the GPS receiver can be reactivated.

23 Claims, 6 Drawing Sheets

OTHER PUBLICATIONS

K. Muthkrishnan et al. "Sensing Motion Using Spectral and Spatial Analysis of WLAN RSSI" eprints/eemcs.utwente.nl/11326/01/1569060976.pdf.

Liao et al. "Inferring High-Level Behavior from Low-Level Sensors" Proceedings of Fifth International Conference on Ubiquitous Computing, UBICOMP2003, Seattle, WA pp. 73-79, Oct. 2003.

\* cited by examiner

CONTROLLING A GPS RECEIVER BY DETECTING MOTION BASED ON RADIOFREQUENCY SIGNAL TRACES

CROSS-REFERENCE TO RELATED APPLICATIONS

This application claims the benefit of priority under 35 U.S.C. §119(e) from U.S. Provisional Patent Application Ser. No. 61/221,348 which was filed Jun. 29, 2009 and entitled CONTROLLING A GPS RECEIVER BY DETECTING MOTION BASED ON RADIOFREQUENCY SIGNAL TRACES.

TECHNICAL FIELD

The present disclosure relates generally to GPS-enabled wireless communications devices and, in particular, to techniques for efficiently operating an onboard GPS chip to prolong battery life.

BACKGROUND

Wireless communications devices such as the BlackBerry® by Research In Motion Limited provide a variety of useful functions, such as voice communication, e-mail and Web browsing. Of growing popularity are mapping and navigation applications or other location-based services that take advantage of a location-fixing system such as a Global Positioning System (GPS) receiver, either embedded as a GPS chipset or externally connected to the device (e.g. via Bluetooth®).

However, the GPS receiver draws a substantial amount of current, thus diminishing the battery life of the wireless communications device. Accordingly, a technique to selectively disable the GPS chip in order to prolong battery life is highly desirable.

One such technique is proposed by Deblauwe et al. in a publication entitled "Hybrid GPS and GSM localization—energy-efficient detection of spatial triggers" published in *Positioning, Navigation and Communication,* 2008. WPNC 2008, 27-27 Mar. 2008 pp. 181-189. This technique compares the wireless device's current location as determined based on GSM measurements with the last position fix obtained by the GPS chip. This technique can be used to reactivate the GPS chip if the positions differ. However, there remains a need for a technique that can be used to both reactivate the GPS chip and also to deactivate the GPS chip.

Accordingly, an improved technique to selectively disable the GPS chip in order to prolong battery life remains highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology prolongs battery life on a GPS-equipped wireless communications device by selectively deactivating the GPS chip when radiofrequency signal traces suggest that the device is stationary and by only reactivating the GPS chip when the radiofrequency signal traces suggest that the device is moving.

Thus, an aspect of the present technology is a method of controlling operation of a Global Positioning System (GPS) receiver in a wireless communications device. The method entails receiving radiofrequency signal traces from one or more base station towers, applying a plurality of tiered classifiers to determine from the signal traces whether the wireless communications device is moving or stationary, deactivating the GPS receiver when the wireless communications device is determined to be stationary, and reactivating the GPS receiver when the wireless communications device is determined to be moving.

Another aspect of the present technology is a machine readable medium comprising code adapted to perform the foregoing method when the machine-readable medium is loaded into memory and executed on a processor of a wireless communications device.

Yet another aspect of the present technology is a wireless communications device having a GPS receiver for determining a current location of the device, a radiofrequency transceiver for receiving signal traces from one or more nearby base stations, and a processor operatively coupled to memory for applying tiered classifiers for determining from the signal traces whether the wireless communications device is moving or stationary, the processor deactivating the GPS receiver when the device is determined to be stationary and reactivating the GPS receiver when the device is determined to be moving.

Yet a further aspect of the present technology is a method of training classifiers for determining whether a wireless communications device is moving or stationary based on radiofrequency signal traces received from nearby base stations. The method entails identifying a plurality of signal features for analyzing signal traces, receiving radiofrequency signal traces from one or more base station towers, receiving accelerometer readings indicating whether the device is moving or stationary, and training classifiers by determining coefficients of logistic functions.

The details and particulars of these aspects of the technology will now be described below, by way of example, with reference to the attached drawings.

Figure 1:
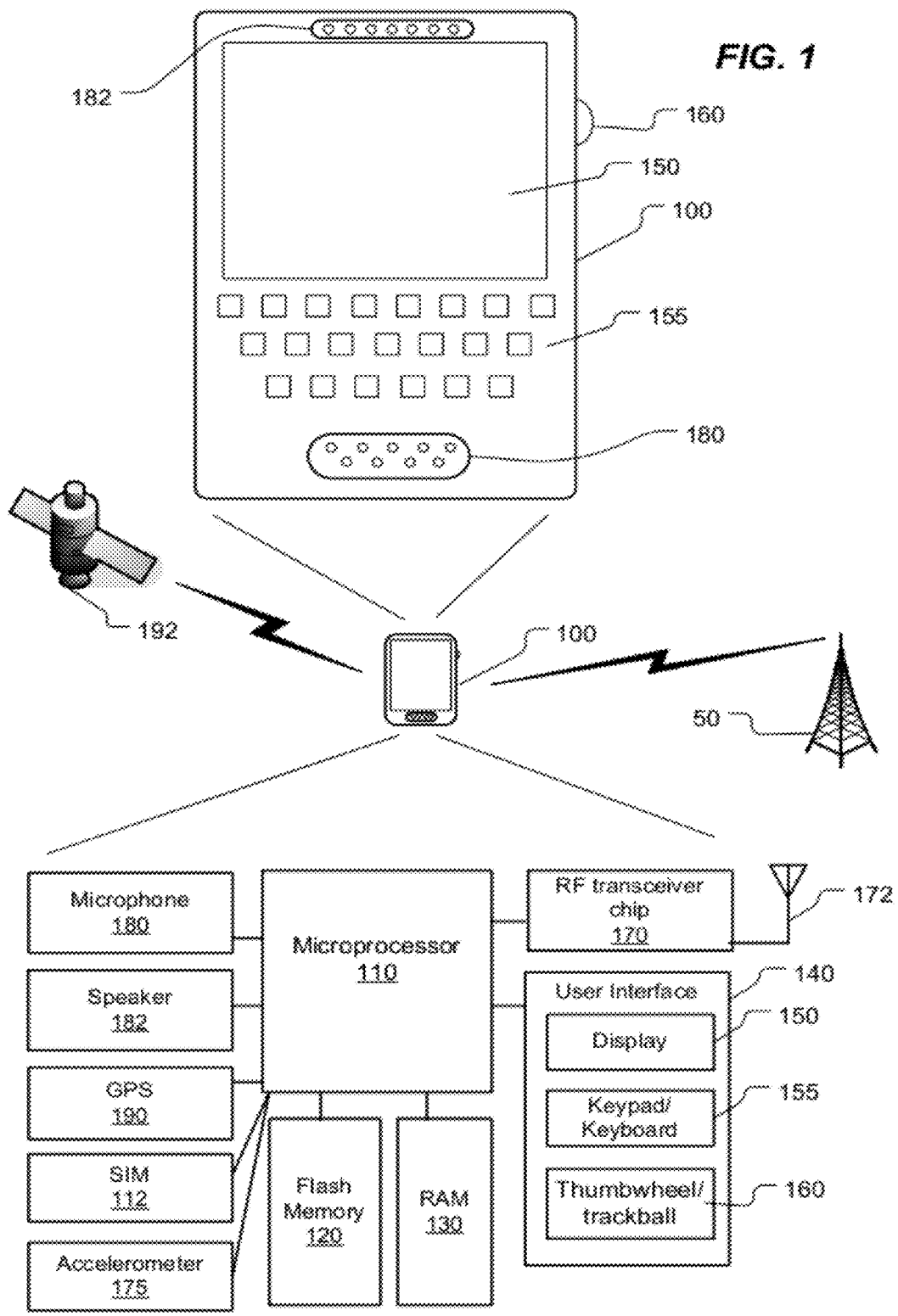
FIG. 1 is a schematic depiction of one example of a wireless communications device on which the present technology can be implemented, the schematic depiction presenting certain main components of the device in block diagram format.

FIG. 1 is a schematic depiction of a wireless communications device 100 on which the present technology can be implemented. For the purposes of this specification, a GPS-enabled wireless communications device includes a GPS-enabled smartphone, a GPS-enabled cell phone, a GPS-enabled wireless PDA, a GPS-enabled wireless computing tablet, a GPS-enabled wireless laptop, and other equivalent devices.

As shown by way of example in FIG. 1, the wireless communications device 100 includes a microprocessor (referred to herein simply as a "processor") 110 operatively coupled to memory (Flash Memory 120 and RAM 130). A SIM (Subscriber Identity Module) card 112 may be provided for GSM (Global System for Mobile) devices. The wireless communications device 100 has a user interface 140 which includes a display (e.g. a LCD screen) 150, a keyboard/keypad 155. The wireless communications device may also include, as depicted in this figure, a thumbwheel/trackball 160. Alternatively, the user interface may include a touch screen. The wireless communications device 100 also includes a radiofrequency (RF) transceiver chip 170 and antenna 172 for sending and receiving data over the air, e.g. via cellular network, via satellite link, etc. The transceiver 170 communicates with a base station 50 (or "base station tower"). The device may include an accelerometer 175 for training the classifiers, as will be elaborated below.

As further illustrated in FIG. 1, the wireless communications device 100 includes a microphone 180 and speaker 182 for voice communications.

As further depicted in FIG. 1, the device 100 includes a Global Positioning System (GPS) chipset 190 (or other equivalent positioning subsystem) to determine the current location of the device based on received signals from orbiting GPS satellites 192. The GPS chipset enables the device to be used for navigation or other location-based services.

Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Radiolocation techniques may also be used in conjunction with GPS in a hybrid positioning system. References herein to "GPS" are meant to include Assisted GPS and Aided GPS.

Figure 2:
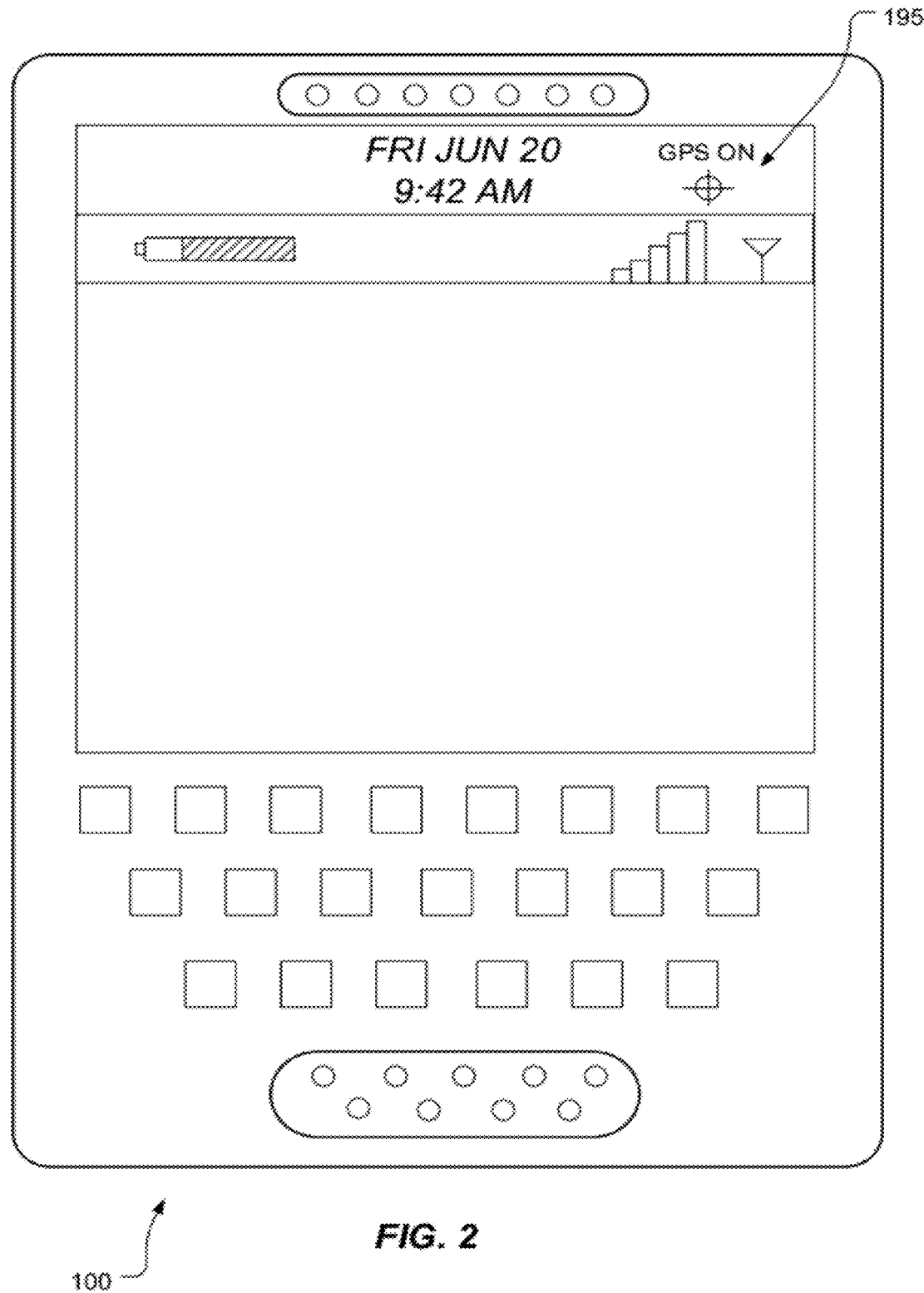
FIG. 2 is a schematic depiction of a wireless communications device showing a GPS visual indicator that, in this particular figure, indicates that the GPS chip is operating.
Figure 3:
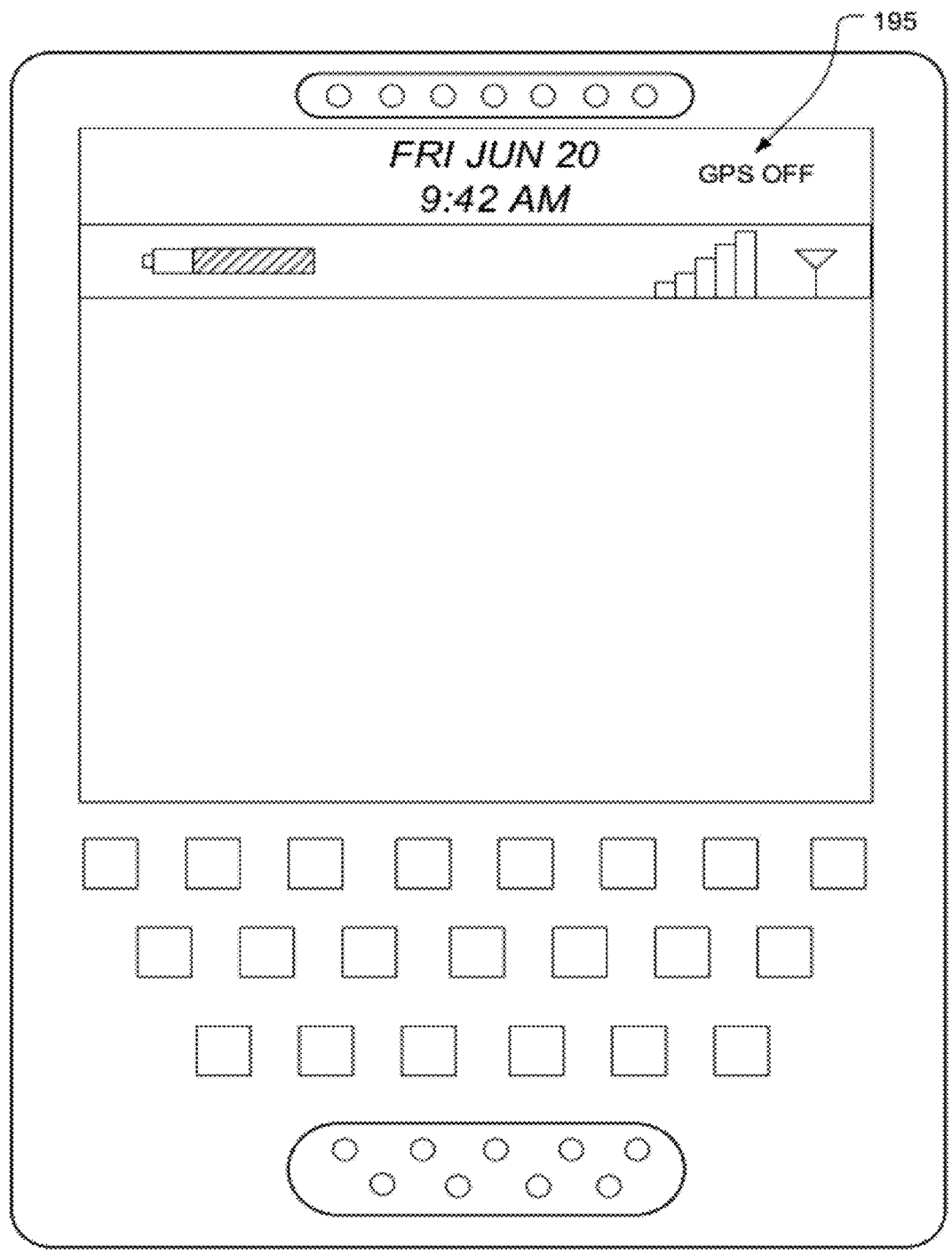
FIG. 3 is a schematic depiction of a wireless communications device showing a GPS visual indicator that, in this particular figure, indicates that the GPS chip is inactive.

FIG. 2 is a schematic depiction of a wireless communications device 100 in which a GPS visual indicator 195 indicates that the GPS chip is operating. FIG. 3 is a similar depiction in which the GPS visual indicator 195 indicates that the GPS chip is inactive. These visual indicators can be any suitable text, symbol or icons. In certain embodiments, the GPS visual indicator may simply be absent, i.e. this indicator, while useful, is not necessarily presented onscreen. A user selection option may also be provided to enable the user to configure the device to either show this indicator or not, or to specify in which instances this indicator is to be displayed onscreen.

Overview

The present technology controls operation of a GPS chip by detecting whether the wireless communications device is moving or stationary. This determination is made by analyzing radiofrequency signals received from nearby base station towers (as shown schematically in FIG. 4). If the wireless communications device is determined to be stationary, the device selectively disables the GPS chip. If the wireless communications device is determined to be moving, then the GPS chip is either kept active or, if the GPS chip has been previously deactivated, it is reactivated. The ability to classify the received signals depends on a careful initial training (or calibration) of one or more suitable classifiers. In other words, this initial training first requires that classifiers be trained (calibrated) to recognize, based on radiofrequency signals received from nearby base station towers, whether the wireless communications device is moving or stationary.

Training the Classifiers

In order to utilize the novel technology described herein, the classifiers must first be trained (calibrated) to recognize whether the received RF signals mean that the device is moving or stationary. First, data is collected using a wireless communications device equipped with an accelerometer 175. Data collected to date indicates that the device is, on average, stationary approximately 90% of the time. This suggests that battery life may be prolonged significantly by selectively disabling (turning off) the GPS receiver (GPS chip) for much of the time when it is not needed. As will be elaborated below, the determination as to whether the device is moving or stationary is made based on radiofrequency signals (e.g. GSM signals) received from one or more nearby base stations (cell towers).

This training technique represents an improvement on the technique described by Timothy Sohn et al. in a publication entitled "Mobility Detection Using Everyday GSM Traces" UbiComp 2006: Ubiquitous Computing (2006), pp. 212-224. Whereas Sohn et al. used human input to collect data as to whether the device was actually moving or not, the improved technique disclosed herein uses an accelerometer inside the device. Alternatively, the accelerometer may be externally connected but portable with the device to still provide useful readings. Furthermore, whereas Sohn et al. collected data at 1-second intervals, the improved technique disclosed herein gathers data at 10-second intervals. Use of a 10-second interval is believed to be more optimally suited for subsequent implementation on a wireless communications device. By gathering data at 10-second intervals, the device only needs to get the GSM signals and perform the calculations on that data every 10 seconds. This has less of an impact on battery and processor resources than if the determinations were made every single second. Since a classifier can only properly classify new data that resembles the data with which it was trained, the training interval (data collection interval for training) should be matched to the operational interval (data collection interval during eventual operation). Accordingly, the improved technique collects data every 10 seconds rather than every second.

The one or more classifiers are then developed by sampling the GSM data at 10-second intervals, as noted above, and then performing several calculations on the data to produce a set of values (parameters) that represent a feature space X. The feature space X is then mapped to a set of labels ("moving" or "stationary"). In other words, the feature space X is then plugged into a logistic function classifier. In this embodiment, the classifier is a logistic function having coefficients that are determined during the training process. Once the coefficients of the logistic function are determined, the classifier is ready/operational and can be used to return a value of either "moving" or "stationary" upon receipt of new GSM data. In one specific implementation, the classifier can be created using WEKA software. As is known in the art, WEKA (Waikato Environment for Knowledge Analysis) is machine-learning software written in Java. The WEKA classifier tools can be used to determine the coefficients for the logistic function. As will be appreciated, this novel technology can be implemented using other software as well.

Signal Parameters (Signal Features)

A plurality of different signal parameters or signal features are determined by analyzing the radiofrequency (RF) signals received by the device from nearby base station towers. In general, these signals can be analyzed in various ways to provide these parameters ("features" or "indicators") that indicate whether the device is probably moving or probably stationary.

In one embodiment, the feature space contains eleven (11) different features or signal parameters that can be calculated based on the signal traces received by the wireless communications device. These are:

1) common cell towers (i.e. common base stations);
2) Spearman rank correlation coefficient;
3) Euclidean distance (with one dimension per tower);
4) Mean of Euclidean distances;
5) Euclidean distance variance;
6) Euclidean distance between endpoints (e.g. between the first and seventh data points);
7) Signal strength variance for all base station towers seen in that window;
8) Mean of Euclidean distances but performed over a full 5 minutes and 1 second for 31 data points (i.e. every 10 seconds over 5 minutes);
9) Euclidean distance variance but performed over a full 5 minutes and 1 second for 31 data points (i.e. every 10 seconds over 5 minutes);
10) Euclidean distance between endpoints but performed over a full 5 minutes and 1 second for 31 data points (i.e. every 10 seconds over 5 minutes); and
11) Signal strength variance for all base station towers seen in that window but performed over a full 5 minutes and 1 second for 31 data points (i.e. every 10 seconds over 5 minutes).

The Euclidean distance is the straight-line distance between two points in three-dimensional space.

The calculations or computations of these parameters can either be performed directly on the device or offloaded wirelessly to a server that returns the results to the device (i.e. return a determination that either the device is stationary or the device is moving.)

As will be appreciated, variations on the time intervals and thus the number of data points used may be envisaged. In other words, the sampling interval of 10 seconds may be varied, for example, to 9 seconds or 11 seconds or to any other suitable sampling interval. Likewise, the window over which the samples are collected may be varied. Furthermore, this novel technology may be refined or varied by employing further parameters (signal features) in addition to the eleven parameters described above. It should be appreciated that the order of these parameters may also be changed.

Figure 4:
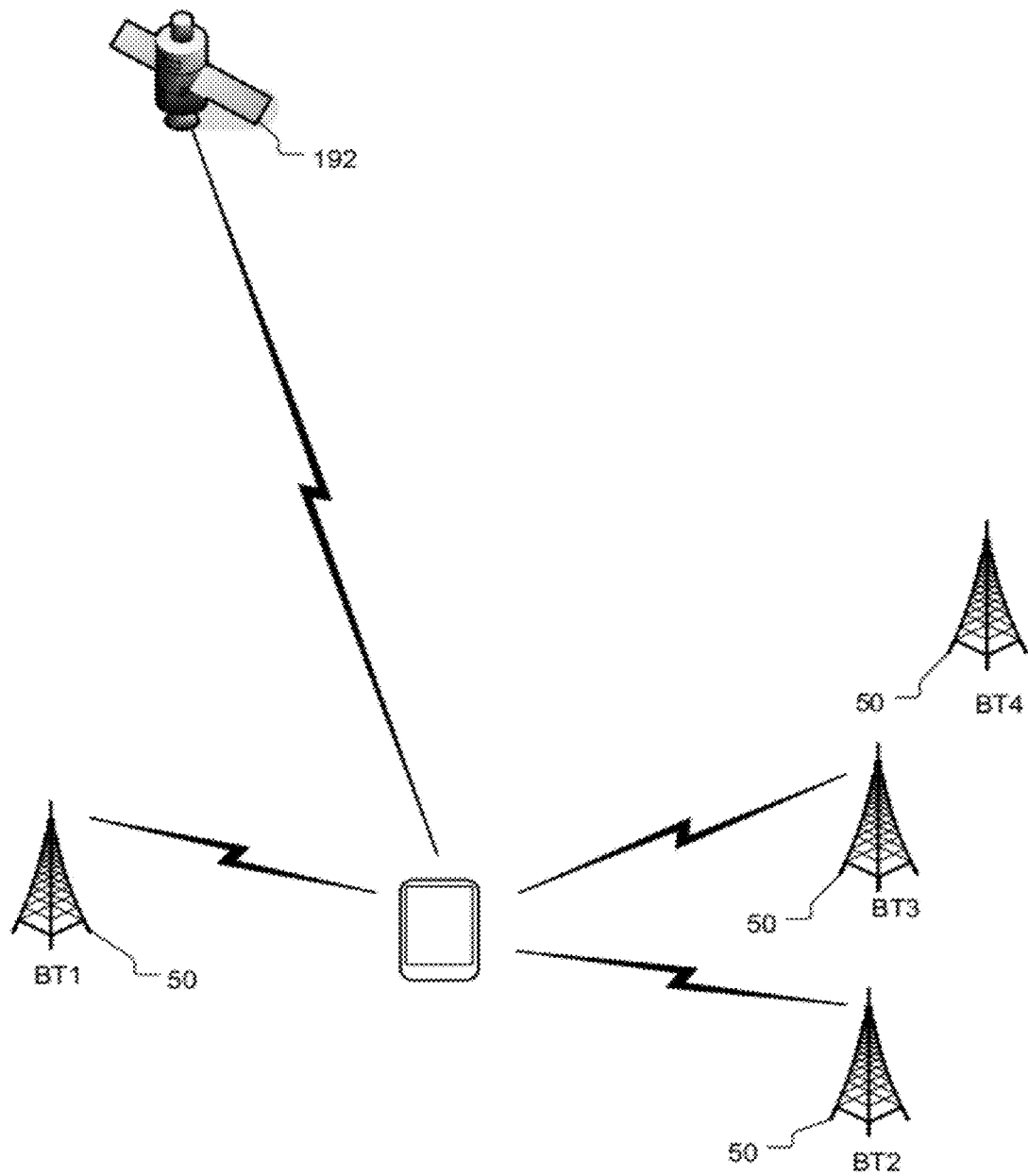
FIG. 4 is a schematic depiction of a wireless communications device receiving radiofrequency signals from multiple base stations.

These parameters (features) can be used in various combinations to enable the device to infer whether the device is moving or stationary. With reference to FIG. 4, the number of base stations from which signal traces are to be drawn in order to initiate the method can be predetermined. For example, the device may be configured to require a minimum of two base stations before the method can be initiated. In FIG. 4, solely by way of example, the wireless communications device is shown receiving RF signals from three different stations, BT1, BT2, and BT3 but not from BT4 which is out of range.

Tiered Classifiers

In one main implementation of this technology, a tiered approach is employed rather than simply computing all eleven parameters (features). In other words, a tiered approach utilizes multiple classifiers that yield a progressively more accurate determination as to whether the device is moving or stationary. Such a tiered approach enables rapid motion determination (in those particular certain instances where the signal data makes this readily apparent to the classifier) while providing progressively more accurate determinations over time for those instances where more detailed analysis of the sampled signals are needed. The tiered approach thus provides highly flexible analysis of the sampled signals that is potentially much quicker than the prior-art technique while still converging to an accurate determination for those instances where the sampled signals yield inconclusive results at the outset.

In one specific implementation, features 1 to 3 are calculated between consecutive data points while features 4 to 11 are calculated over a moving window. In one particular implementation, features 4 to 7 are calculated over a short window (e.g. a 1 minute 1 second window of time representing 7 data points) while features 8 to 11 are calculated over a long window (e.g. a 5 minute 1 second window representing 31 data points).

This particular implementation therefore involves using at least three classifiers in a tiered approach. As presented in Table 1 below, classifier #1 computes three (3) features based on only two (2) consecutive data points collected every ten (10) seconds during the first minute. Even though this provides a highly granular result, in some instances, it is sufficient to provide an indication that the device is either moving or stationary. In this particular implementation, a second tier classifier kicks in after a minute by computing seven (7) features based on seven (7) data points (i.e. using a short moving window). After five minutes, a third tier classifier begins to compute all eleven (11) features based on thirty-one (31) data points (i.e. using a long moving window).

TABLE 1

| Tiered Classifiers | | | |
|---|---|---|---|
| CLASSIFIER #1 | first 3 features | 2 data points | t = 0 to t = 59 sec. |
| CLASSIFIER #2 | first 7 features | 7 data points | t = 60 sec to t = 4 min 59 sec |
| CLASSIFIER #3 | all 11 features | 31 data points | t = 5 min onward |

Three tiers (or levels) of classifiers are thus employed for progressively converging toward an increasingly more accurate determination as to whether the wireless device is in motion or whether it is stationary. The primary advantage of this novel tiered approach is that, depending on the particular signal traces being analyzed, the tiered approach can be much quicker than the approach proposed by Sohn et al. of collecting data for a full five minutes before computing the parameters. In other words, if the signal traces are unambiguously indicative of motion (or, conversely, unambiguously suggest that the device is stationary), then a determination can be made within the first minute. If the first tier analysis is inconclusive, the second tier may be able to provide a determination. If the second tier provides a determination as to whether the device is moving or stationary, then this too would be quicker than what would have been achieved using the prior-art technique. If the second tier classifier fails to resolve whether the device is moving or not, the third tier classifier is then called upon for a detailed analysis. The third tier classifier begins computing all eleven features as would have been done by the prior-art technique after the same of period of five minutes has elapsed. Thus, the tiered classification is not any slower than the prior-art technique. However, in certain cases, it will provide useful results faster than the prior-art approach.

Optionally, a fourth classifier may be initiated at any point after the first five minutes have elapsed since start-up. This fourth classifier, in one specific embodiment, is trained on data collected at 60-second intervals (rather than on data collected at 10-second intervals). At that point, the device can sample the RF signal traces (e.g. GSM signal traces) every 60 seconds instead of every 10 seconds, thus further diminishing the utilization of both processor and battery resources.

Optionally, a fifth classifier may be initiated after 30 minutes have elapsed since start-up. This fifth classifier is even more accurate than the fourth classifier, and can be used on data collected at a different sampling interval than what is used for the fourth classifier.

Thresholds

In order to preclude the device was vacillating ("flip-flopping") between on and off in cases where the classifiers provide rapidly alternating results of moving and stationary, the device may utilize threshold functions. The threshold functions ensure that there a predetermined minimum number of consistent readings (determinations) before deactivating or reactivating the GPS chip. For example, the device may be configured or programmed to wait until three consecutive (i.e. consistent) readings indicating that the device is in motion are obtained before reactivating the GPS chipset. In other words, the technique may involve deferring reactivation of the GPS receiver until the device has determined for a predetermined minimum consecutive number of times that the device is moving.

Also by way of example, the device may be programmed to wait until there has been five minutes without motion before powering down (deactivating) the GPS chipset. In other words, the technique may involve deferring deactivation of the GPS receiver until the device has determined that the device has remained stationary for a period of exceeding a predetermined time threshold. The thresholds can be varied, either by the manufacturer, by the system administrator or by the user. For example, the user may prefer that the device wait ten minutes before powering off the GPS chip. In a variant, the device may automatically adjust this threshold based on the detected battery life. For example, as the battery is progressively depleted, the threshold may be adjusted downwardly so that the GPS is shut off earlier to thus further prolong battery life.

Figure 5:
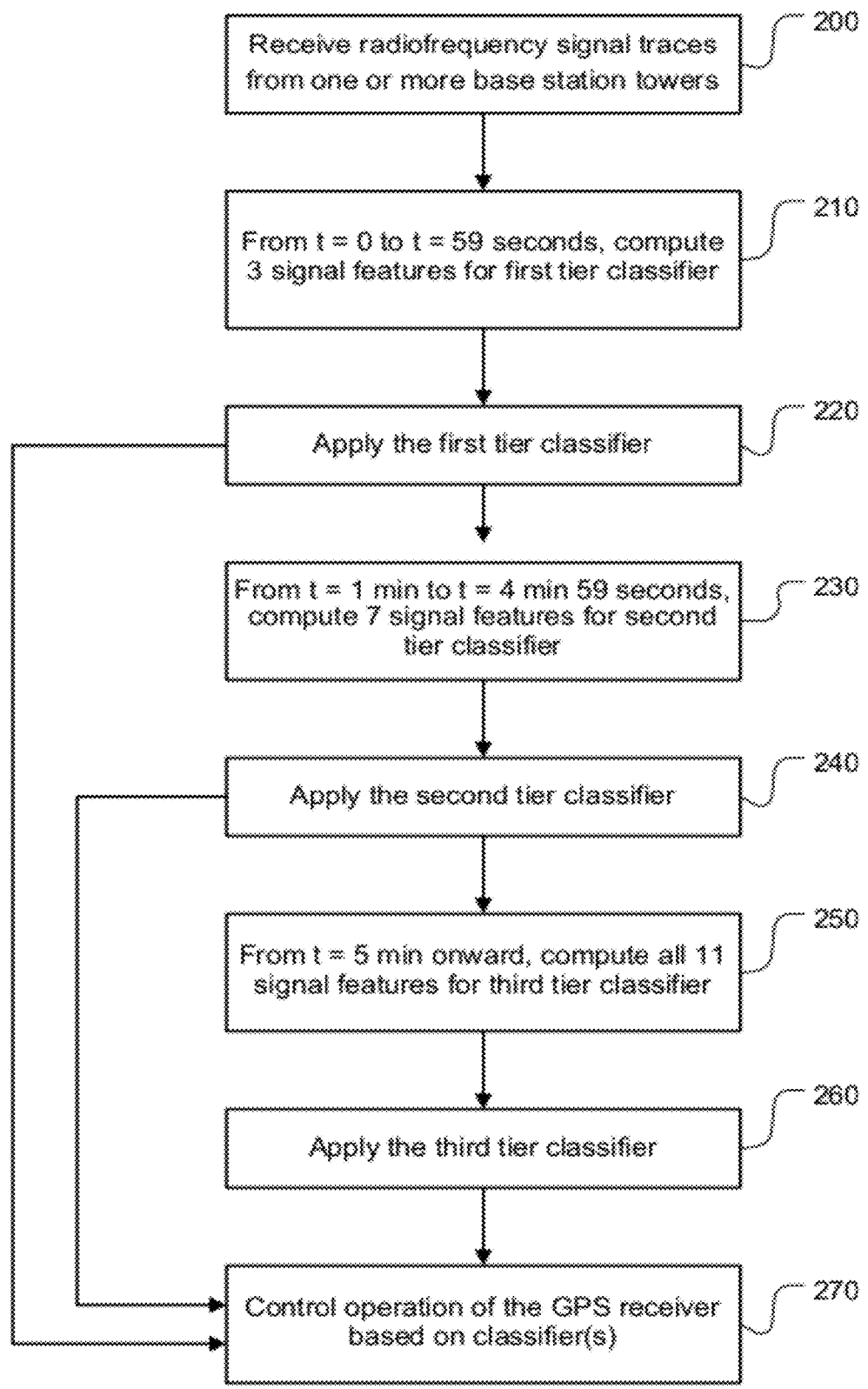
FIG. 5 is a flowchart depicting main steps of a method of controlling operation of a GPS receiver in accordance with an implementation of the present technology.

FIG. 5 is a flowchart depicting the main steps of a method of controlling operation of a GPS chip by determining whether the device within which the GPS chip is embedded is moving or stationary.

As depicted in FIG. 5, an initial step 200 is to receive radiofrequency signal traces, e.g. GSM signal traces, from one or more nearby base stations (as was illustrated schematically in FIG. 4). A subsequent step 210 of this novel method is to compute three signal parameters (signal features) from the signal traces. In the example implementation depicted in the flowchart of FIG. 5, this is accomplished over a period of one minute, i.e. from t=0 to t=59 seconds. In one implementation, the first tier classifier employs the first three (3) parameters from the list of eleven parameters set forth above, namely (1) common cell towers; (2) Spearman rank correlation coefficient; and (3) Euclidean distance. These first three features are used to define the first tier classifier. This first tier classifier is then applied at step 220 to determine approximately whether the device is moving or stationary, i.e. to provide a very quick, albeit rough, estimate as to whether the device is moving or stationary.

This first tier classifier can thus be used after a very short period of time to begin controlling operation of the GPS chip (step 270) based on whether the first tier classifier suggests that the device is moving or not. Unlike the prior art which can take five minutes to make a determination, the first tier classifier can provide, after only one (1) minute of data collection, an initial classification (moving or stationary) that enables the device to begin the process of controlling operation of its GPS chip at step 270.

Controlling operation of the GPS chip may involve, for example, deactivating the chip, reactivating the chip, or permitting the chip to continue in its current state, as the case may be. In other words, based on these first three parameters, the device can initiate early control of the GPS chip (step 270) even if the motion determination at this early stage is only approximate.

Still referring to the flowchart depicted in FIG. 5, while the GPS chip is being controlled based on the first tier classifier, further data is collected at step 230 from t=1 min to t=4 min 59 seconds in this example implementation. From this additional data are computed seven (7) signal features for the second tier classifier. This second tier classifier provides a more accurate determination as to whether the device is moving or stationary, i.e. the second tier classifier is more accurate than the first tier classifier. This more accurate second tier classifier is then applied at step 240 to determine whether the device is moving or not. This second tier classifier is then used at step 270 to control the GPS chip, e.g. by deactivating the chip, reactivating the chip or permitting the chip to continue in its current state. This second tier classifier thus overrides the determination may be the less accurate first tier classifier.

In this example implementation, the second tier classifier employs seven (7) signal features as follows: (1) common base station towers; (2) Spearman rank correlation coefficient; (3) Euclidean distance; (4) mean of Euclidean distance over 7 data points; (5) variance of Euclidean distance over 7 data points; (6) Euclidean distance between endpoints over 7 data points; and (7) signal strength variance for all base stations in window over 7 data points.

Still referring to the flowchart depicted in FIG. 5, while the GPS chip is being controlled based on the second tier classifier, yet further data is collected at step 250 from t=5 minutes onward in this example implementation. From t=5 minutes onward, the third tier classifier (which is more accurate than the first and second classifiers) is computed using all eleven (11) signal features. This third tier classifier is then applied at step 260 to determine if the device is moving or stationary. This third tier classifier is thus used to control (e.g. deactivate or reactivate) the GPS chip at step 270 based on whether the third tier classifier suggests that the device is moving or stationary.

In this example implementation, the third tier classifier employs all eleven (11) signal features as follows: (1) common base station towers; (2) Spearman rank correlation coefficient; (3) Euclidean distance; (4) mean of Euclidean distance over 7 data points; (5) variance of Euclidean distance over 7 data points; (6) Euclidean distance between endpoints over 7 data points; (7) signal strength variance for all base stations in window over 7 data points; (8) Mean of Euclidean distances but performed over a full 5 minutes and 1 second for 31 data points (i.e. every 10 seconds over 5 minutes); (9) Euclidean distance variance but performed over a full 5 minutes and 1 second for 31 data points (i.e. every 10 seconds over 5 minutes); (10) Euclidean distance between endpoints but performed over a full 5 minutes and 1 second for 31 data points (i.e. every 10 seconds over 5 minutes); and (11) Signal strength variance for all base station towers seen in that window but performed over a full 5 minutes and 1 second for 31 data points (i.e. every 10 seconds over 5 minutes).

In another implementation, fourth, fifth or any number of subsequent tiered classifiers can be utilized to provide additional tiers. These additional tiers may, for example, collect data samples at a longer time interval. For example, a fourth tier classifier could be created for sampling signal traces and computing signal features every 60 seconds. This could be used to reduce the computational burden on the device once the third tier classifier has been applied. A fifth (or subsequent) tier classifier may be defined having a different sampling interval than the fourth classifier, for example.

From the foregoing, it will be understood that the classifiers each comprise sets or groups of calculations or computations of distance, variance, mean, etc. that are performed on the signal traces. For any given classifier, these calculations or computations may be performed sequentially or in parallel. The result of each such calculation represents a particular feature of the signal or signal parameter. These features or parameters are then grouped together to provide a classification result for each classifier. The classifier thus classifies the signal traces as indicative of motion or a lack thereof.

Figure 6:
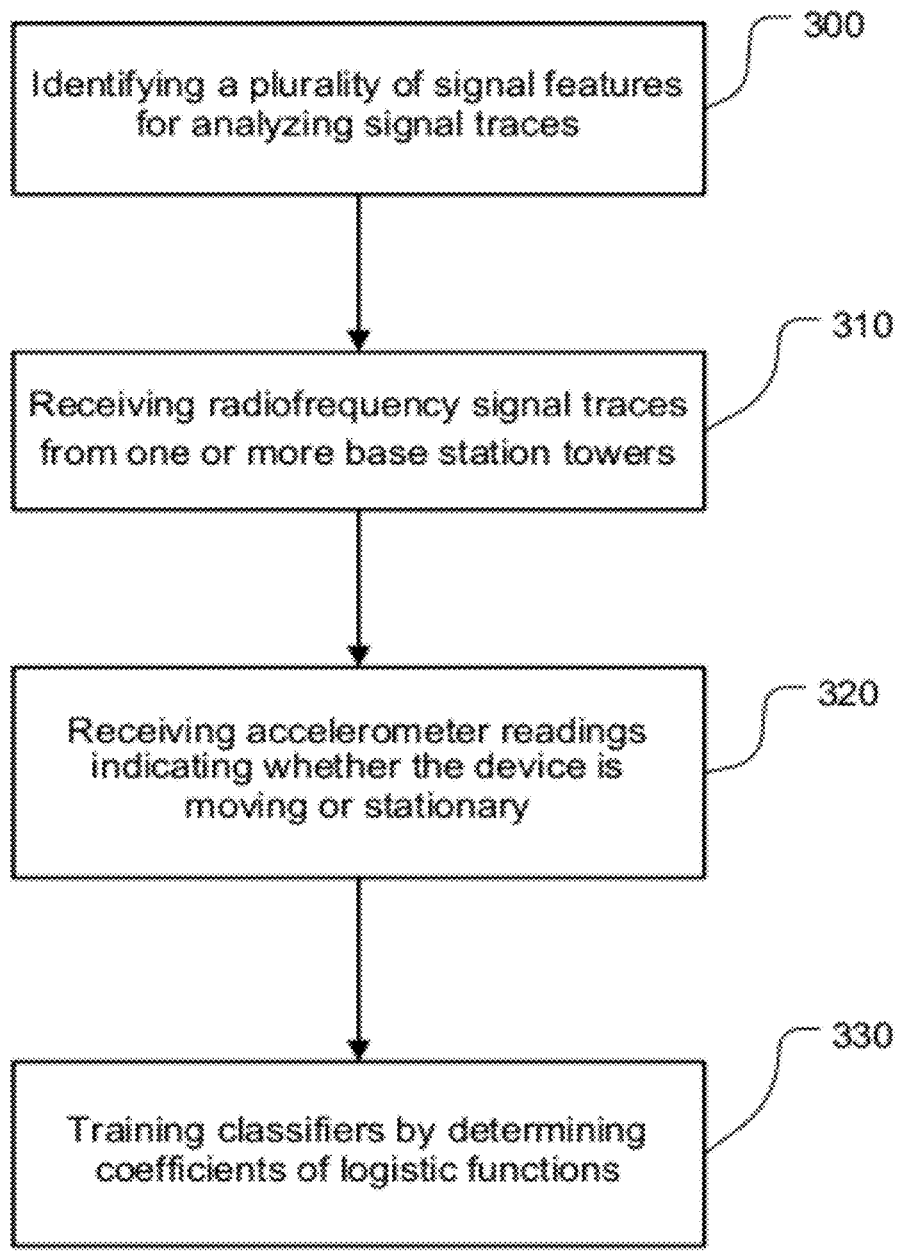
FIG. 6 is a flowchart depicting main steps of a method of training classifiers for implementing the method depicted in FIG. 5.

FIG. 6 is a flowchart depicting main steps of a method of training the classifiers, as was described above. This method of training classifiers involves a step 300 of identifying a plurality of signal features for analyzing signal traces, a step 310 of receiving radiofrequency signal traces from one or more base station towers, a step 320 of receiving accelerometer readings indicating whether the device is moving or stationary, and a step 330 of training classifiers by determining coefficients of logistic functions.

The determination as to whether the device is moving or stationary is used to control operation of the GPS chip (also referred to herein as the GPS receiver or GPS chipset) or any other positioning subsystem or location-determining hardware, software or firmware on the device. A manual override may be provided to enable the user to reactivate the GPS chip (when the device is stationary) or, conversely, to shut it off (when the device is moving). A user configuration menu or options page may be provided to enable the user to specify conditions or preferences for how operation of the GPS receiver is to be controlled. For example, the options page may have settings to enable the operation of the GPS receiver to be control based on time parameters or location parameters. For example, if the device is operating in a certain place and/or at a certain time, the device may override the classifiers to either keep the GPS on or, conversely, shut it off, despite what the classifiers would normally suggest doing.

The technology disclosed herein may be implemented in hardware, software, firmware or any combination thereof. For example, the foregoing methods can be implemented as coded instructions on a machine-readable medium. In other words, the machine-readable medium may be a computer-readable medium upon which software code is recorded to perform the foregoing method or methods when the machine-readable medium is loaded into memory and executed on the microprocessor of the wireless communications device or on any other computing device connected to the wireless communications device.

The present technology has been implemented using GSM technology. For a GSM implementation, the operating system (O/S level) passes signal trace information from all towers in range to the Java level where it can be readily utilized for motion analysis. For a CDMA implementation, on the other hand, as will be appreciated by those of skill in the art, the signal trace information is not automatically passed up to the Java level. Therefore, to implement this technology using CDMA, it is necessary to bridge the O/S and Java levels to ensure that the signal trace information is available at the Java level.

This new technology has been described in terms of specific implementations and configurations (and variants thereof) which are intended to be exemplary only. Persons of ordinary skill in the art will therefore appreciate that many obvious modifications, variations, refinements and alterations may be made that do not depart from the inventive concept(s) disclosed herein. The scope of the exclusive right sought by the applicant is therefore intended to be limited solely by the appended claims.

The invention claimed is:

1. A method of controlling operation of a Global Positioning System (GPS) receiver in a wireless communications device, the method comprising:
   receiving radiofrequency signal traces from one or more base station towers;
   applying a plurality of tiered classifiers to determine from the signal traces whether the wireless communications device is moving or stationary;
   deactivating the GPS receiver when the wireless communications device is determined to be stationary; and
   reactivating the GPS receiver when the wireless communications device is determined to be moving.

2. The method as claimed in claim 1 wherein applying the plurality of tiered classifiers comprises:
   applying a first tier classifier based on three signal features;
   applying a second tier classifier based on seven signal features; and
   applying a third tier classifier based on eleven signal features.

3. The method as claimed in claim 2 wherein applying the first tier classifier comprises computing three signal features over two consecutive data points for a first minute.

4. The method as claimed in claim 3 wherein applying the second tier classifier comprises computing seven signal features over a short moving window of seven data points after one minute has elapsed for a subsequent four minutes.

5. The method as claimed in claim 4 wherein applying the third tier classifier comprises computing eleven signal features over a long moving window of thirty-one data points after five minutes have elapsed.

6. The method as claimed in claim 2 wherein applying the plurality of tiered classifiers further comprises applying a fourth tier classifier by sampling signal traces and computing signal features every 60 seconds.

7. The method as claimed in claim 6 wherein applying the plurality of tiered classifiers further comprises applying a fifth tier classifier having a sampling interval different from a sampling interval of the fourth tier classifier.

8. The method as claimed in claim 2 wherein the three signal features used for the first tier classifier are:
   (i) common base station towers;

(ii) Spearman rank correlation coefficient; and
(iii) Euclidean distance.

9. The method as claimed in claim 2 wherein the seven signal features used for the second tier classifier are:
(i) common base station towers;
(ii) Spearman rank correlation coefficient;
(iii) Euclidean distance;
(iv) mean of Euclidean distance over 7 data points;
(v) variance of Euclidean distance over 7 data points;
(vi) Euclidean distance between endpoints over 7 data points; and
(vii) signal strength variance for all base stations in window over 7 data points.

10. The method as claimed in claim 2 wherein the eleven signal features used for the third tier classifier are:
(i) common base station towers;
(ii) Spearman rank correlation coefficient;
(iii) Euclidean distance;
(iv) mean of Euclidean distance over 7 data points;
(v) variance of Euclidean distance over 7 data points;
(vi) Euclidean distance between endpoints over 7 data points;
(vii) signal strength variance for all base stations in window over 7 data points;
(viii) mean of Euclidean distance over 31 data points;
(ix) variance of Euclidean distance over 31 data points;
(x) Euclidean distance between endpoints over 31 data points; and
(xi) signal strength variance for all base stations in window over 31 data points.

11. The method as claimed in claim 1 further comprising deferring reactivation of the GPS receiver until the device has determined for a predetermined minimum consecutive number of times that the device is moving.

12. The method as claimed in claim 1 further comprising deferring deactivation of the GPS receiver until the device has determined that the device has remained stationary for a period of exceeding a predetermined time threshold.

13. A machine-readable storage medium comprising instructions in code which, when loaded into memory and executed on a processor of a wireless communications device, controls operation of a Global Positioning System receiver in the wireless communications device by:
receiving radiofrequency signal traces from one or more base station towers;
applying a plurality of tiered classifiers to determine from the signal traces whether the wireless communications device is moving or stationary;
deactivating the GPS receiver when the wireless communications device is determined to be stationary; and
reactivating the GPS receiver when the wireless communications device is determined to be moving.

14. A wireless communications device comprising:
a GPS receiver for determining a current location of the device;
a radiofrequency transceiver for receiving signal traces from one or more nearby base stations; and
a processor operatively coupled to memory for applying tiered classifiers for determining from the signal traces whether the wireless communications device is moving or stationary, the processor deactivating the GPS receiver when the device is determined to be stationary and reactivating the GPS receiver when the device is determined to be moving.

15. The device as claimed in claim 14 wherein the processor applies a first tier classifier based on three signal features, a second tier classifier based on seven signal features, and a third tier classifier based on eleven signal features.

16. The device as claimed in claim 15 wherein the first tier classifier computes three signal features over two consecutive data points for a first minute.

17. The device as claimed in claim 16 wherein the second tier classifier computes seven signal features over a short moving window of seven data points after one minute has elapsed for a subsequent four minutes.

18. The device as claimed in claim 17 wherein the third tier classifier computes eleven signal features over a long moving window of thirty-one data points after five minutes have elapsed.

19. The device as claimed in claim 16 wherein the three signal features used for the first tier classifier are:
(i) common base station towers;
(ii) Spearman rank correlation coefficient; and
(iii) Euclidean distance.

20. The device as claimed in claim 17 wherein the seven signal features used for the second tier classifier are:
(i) common base station towers;
(ii) Spearman rank correlation coefficient;
(iii) Euclidean distance;
(iv) mean of Euclidean distance over 7 data points;
(v) variance of Euclidean distance over 7 data points;
(vi) Euclidean distance between endpoints over 7 data points; and
(vii) signal strength variance for all base stations in window over 7 data points.

21. The device as claimed in claim 18 wherein the eleven signal features used for the third tier classifier are:
(i) common base station towers;
(ii) Spearman rank correlation coefficient;
(iii) Euclidean distance;
(iv) mean of Euclidean distance over 7 data points;
(v) variance of Euclidean distance over 7 data points;
(vi) Euclidean distance between endpoints over 7 data points;
(vii) signal strength variance for all base stations in window over 7 data points;
(viii) mean of Euclidean distance over 31 data points;
(ix) variance of Euclidean distance over 31 data points;
(x) Euclidean distance between endpoints over 31 data points; and
(xi) signal strength variance for all base stations in window over 31 data points.

22. A method of training classifiers for determining whether a wireless communications device is moving or stationary based on radiofrequency signal traces received from nearby base stations, the method comprising:
identifying a plurality of signal features for analyzing signal traces;
receiving radiofrequency signal traces from one or more base station towers;
receiving accelerometer readings indicating whether the device is moving or stationary; and
training classifiers by determining coefficients of logistic functions.

23. The method as claimed in claim 22 wherein training the classifiers comprises training a first tier classifier, a second tier classifier and a third tier classifier that provide a progressively more accurate determination as to whether the wireless communications device is moving or stationary.

* * * * *